United States Patent [19]

Gordon et al.

[11] 4,093,571

[45] June 6, 1978

[54] PROCESS FOR MAKING POROUS METAL CONTAINING POWDER COATING COMPOSITIONS

[75] Inventors: Marvin Gordon, Succassuna; Martin J. Hannon, Martinsville; Henry H. George, Jr., Berkeley Heights, all of N.J.

[73] Assignee: Celanese Corporation, New York, N.Y.

[21] Appl. No.: 649,128

[22] Filed: Jan. 14, 1976

[51] Int. Cl.² ............................................. C08J 9/30
[52] U.S. Cl. ............................ 260/2.5 B; 260/2.5 N; 260/2.5 HA; 260/2.5 L; 260/2.5 HB; 260/2.5 F; 260/29.1 R; 260/29.2 R; 260/29.2 UA; 260/29.6 R; 260/29.6 F; 260/29.6 XA; 260/29.6 AB; 260/29.6 RB; 260/29.6 BM; 260/29.6 MM; 260/37 M; 260/37 N; 260/40 R; 260/40 TN; 260/42.22
[58] Field of Search ....................................... 260/2.5B, 260/2.5 M, 42.22

[56] References Cited

U.S. PATENT DOCUMENTS

| | | | |
|---|---|---|---|
| 3,739,049 | 6/1973 | Honjo | 264/13 |
| 3,737,401 | 6/1973 | Tsou et al. | 260/34.2 |
| 3,710,848 | 11/1973 | Labana et al. | 260/836 |
| 3,775,352 | 11/1973 | Leonard, Jr. | 260/2.5 HA |
| 3,803,111 | 4/1974 | Munro et al. | 260/33 X R |
| 3,933,579 | 1/1976 | Kershow et al. | 260/2.5 B |
| 3,942,903 | 3/1976 | Dickey et al. | 260/2.5 B |

*Primary Examiner*—Morton Foelak

[57] ABSTRACT

The present invention provides a process for preparing metal particle-containing powder coating compositions as well as the powder coating compositions produced by this process. The process involves spraying a solution which comprises solvent, resin, curing agent, and suspended metal particles to form droplets, and collecting the sprayed droplets in a liquid bath. The liquid bath contains a liquid which is miscible with the solvent but which is non-solvent for the solutes of the solution. The liquid bath is subjected to a radial motion. Thus the powder coating compositions are precipitated in substantially non-agglomerated form.

The resulting metal particle-containing powder coating compositions are useful in powder coating applications such as powder painting when it is desired to impart a metallic finish to an article such as an automobile. These powder coating compositions are particularly useful when it is desired to impart to a surface a thin film, such as a coil coating.

13 Claims, 1 Drawing Figure

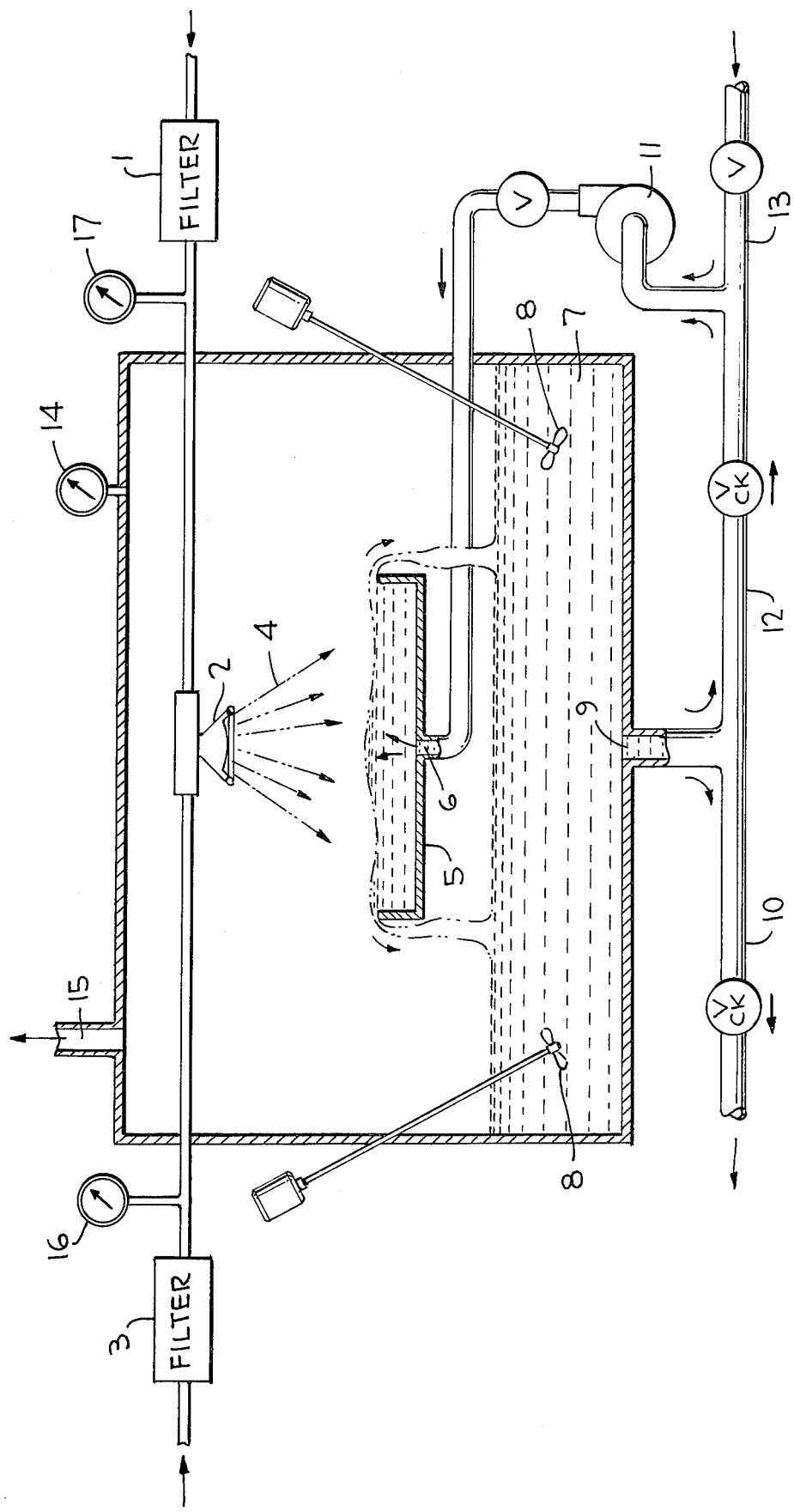

PROCESS FOR MAKING POROUS METAL CONTAINING POWDER COATING COMPOSITIONS

BACKGROUND OF THE INVENTION

Powder coating compositions which may be used for powder coating applications such as powder painting are advantageous in that they eliminate the disadvantages associated with the use of solvents in liquid paint systems, as for example, the liquid paint system disclosed in U.S. Pat. No. 2,857,354. Powder coating paint compositions are curable by heat in such a way that little, if any, volatile material is vaporized or evaporated into the environment. This, of course, is substantially different from liquid paint systems where the liquid paint vehicle is volatilized during the drying of the paint.

Processes for preparing powders for various applications are disclosed, for example, in U.S. Pat. Nos. 3,429,921, 3,730,930 3,737,401 and 3,770,848.

In the production of metal particle-containing powder coating compositions, there has been a problem in the past with degradation of the metallic ingredient. Since the metallic ingredient is used primarily for decorative purposes, as, for example, automobile top coats, where it is necessary that the finish have a metallic look, any degradation of the metal particle or flake presents a serious aesthetic problem.

It is known to produce metal particle-containing powder coating compositions by grinding metal particle-containing resin sheets to form pellets. However, this grinding operation tends to degrade the metal particles contained within the resin.

A prior art method for preparing metal particle-containing powder coating compositions is disclosed, for example, in U.S. Pat. No. 3,739,049. A particularly efficacious method is disclosed in U.S. Pat. No. 3,303,111 wherein such powders are prepared by spray-drying acrylic polymer solutions.

West German Pat. No. 2,419,330 discloses a process for producing powder coating compositions having a fine particle size. This process comprises spraying a solution of polymer in the form of a mist or fine droplets, contacting the mist or fine droplets with a precipitant for the polymer, precipitating the polymer in fine particle size upon such contact, and recovering the fine powder particles produced.

A difficulty involved with mamy of the processes for producing powder coatings is that such processes tend to produce powder particles many of which have become agglomerated because of the inability to keep the particles separate when produced in a liquid bath. Agglomeration is to be avoided, especially when thin film applications are desired.

The search has continued for improved processes for producing metal particle-containing powder coating compositions wherein the metal praticles remain substantially undegraded and wherein the powder coating compositions are in substantially non-agglomerated form.

OBJECTS AND SUMMARY OF THE INVENTION

Accordingly, a general object of the present invention is to avoid or substantially alleviate the above problems of the prior art.

A more specific object is the provision of a process for preparing metal particle-containing powder coating compositions.

It is a further object of the present invention to provide a process for preparing metal particle-containing powder coating compositions in substantially non-agglomerated form.

Still another object of the present invention is to provide a process for preparing metal particle-containing powder coating compositions wherein the metallic ingredient remains substantially undegraded during the process.

Yet another object of the present invention is to provide the substantially non-agglomerated metal particle-containing powder coating compositions produced by this process.

Yet another object of the present invention is to provide metal particle-containing powder coating compositions with sufficiently low bulk density to render them useful in thin film applications.

Other objects and advantages of the present invention will become apparent from the following summary and description of the preferred embodiments of the present invention.

In one aspect, the present invention provides a process for preparing metal particle-containing powder coating compositions useful in powder coating applications. This process comprises (a) spraying a solution comprising solvent, resin, curing agent, and suspended metal particles to form droplets, and (b) collecting the sprayed droplets in a liquid bath wherein the liquid is miscible with the solvent but is a non-solvent for the solutes of the solution and wherein the liquid bath is subjected to a radial motion thereby precipitating the powder coating compositions in substantially non-agglomerated form.

In another aspect, the present invention provides the substantially non-agglomerated metal particle-containing powder coating compositions produced by this process.

The essence of the present invention is discovery that (a) metal particle-containing powder coating compositions may be prepared without substantially degrading the metallic ingredient by using a combined spray/-precipitation technique, and (b) the use of radial motion or radial flow in the liquid precipitant results in the production of powder coating compositions in substantially non-agglomerated form.

DESCRIPTION OF THE DRAWING

The drawing is a schematic illustration of a representative apparatus arrangement for carrying out the process of the present invention.

DESCRIPTION OF THE PREFERRED EMBODIMENTS

As indicated hereinabove, the process of the present invention comprises two essential steps — a spraying step and a precipitation step. The former step comprises the spraying of a solution containing solvent, resin, curing agent, and suspended metal particles into a liquid bath. A pigment may also be used in the solution if additional color is desired in the final powder product.

In this specification, the term "solution" is meant to include not only the solvent and those solutes which dissolve in the solvent, but also those materials which remain suspended within the solution. Materials which may remain suspended within the solution include metal particles and pigments.

The solvent used in the process of the present invention may be any liquid or combination of liquids which will substantially dissolve the resin, curing agent, and any catalyst which may be present, and as long as the liquid of the liquid bath is a non-solvent for the resin, curing agent, and catalyst but is miscible with the solvent. Solvents useful in the present invention may be either organic or inorganic. Typical organic solvents include hydrocarbons such as hexane, toluene and xylene; ketones such as acetone, methyl ethyl ketone and methyl isobutyl ketone; alcohols such as methanol, ethanol, propanol, and butanol. Other solvents include methoxyethyl acetate and diethyl ether of diethylene glycol.

Typical inorganic solvents include water and acidic aqueous solutions such as hydrochloric acid, phosphoric acid, and sulfuric acid.

Acetone is a particularly preferred solvent in the present invention.

Sufficient solvent is used such that the resin and curing agent may be substantially dissolved in the solvent. Thus, there may be employed generally from about 25 to about 55, typically from about 30 to about 50, and preferably from about 35 to 45 percent by weight solvent based upon the total weight of the solution.

It is also possible to include within the resin solution some liquid preciptant as described hereinbelow. The amount thereof will vary depending upon the particular resin solvent, the resin concentration, and the particular liquid precipitant. Generally any amount up to the amount that will cause precipitation of the resin in the resin solution may be used. By means of this expedient, one may employ a smaller amount of precipitant in the powder forming reaction. The amount to be used in this manner is readily determined by one skilled in this art.

The resin which is employed in the process of the present invention is used to provide the solid matrix which surrounds the metal particles or flake. Any resin which is melt extrudable and which will cure in the presence of a curing agent at a particular minimum temperature (as discussed hereinbelow) to form a suitable coating such as an automobile or home appliance topcoat may be used in the present process.

Such resins include polymeric acrylics, polyepoxies such as the diglycidyl ether of bisphenol A, polyesters, polyolefins, polyamides, polyethers, vinyl resins such as polyvinyl chloride, polyvinyl acetate, and styrene/butadiene copolymer, cellulosic esters, polyacetals, polyurethanes, silicones, and alkyd resins. If flame retardant properties are desired, these resins should be halogenated, i.e., contain halogen (e.g. bromine and/or chlorine) substitution within the polymer molecules.

It should be readily apparent to those skilled in the art that the polymers suitable for use in the present invention include both thermoplastic and thermosetting polymers. Since the methods of preparing these polymers are so well known in the art, no discussion of such methods need be presented herein.

Acrylic polymers are particularly preferred in the process of the present invention. The term acrylic resin as used herein includes any polymer, whether thermosetting or thermoplastic, which is prepared by the free-radical addition polymerization of one or more ethylenically unsaturated monomers, at least 50 weight percent of which is selected from the group consisting of acrylic and methacrylic acid, alkyl, cycloalkyl, and aralkyl esters of acrylic and methacrylic acids, wherein the esters moiety contains from 1 to about 18 carbon atoms, and the hydroxyalkyl esters of acrylic and methacrylic acids, wherein the hydroxyalkyl moiety contains from 2 to about 10 carbon atoms.

Examples of suitable alkyl, cycloalkyl, aralkyl, and hydroxyalkyl esters of acrylic and methacrylic acids include, among others, methyl acrylate, ethyl acrylate, isopropyl acrylate, n-butyl acrylate, t-butyl acrylate, 2-ethylhexyl acrylate, dodecyl acrylate, octadecyl acrylate, methyl methacrylate, n-butyl methacrylate, 2-ethylhexyl methacrylate, octyl methacrylate, tridecyl methacrylate, hexadecyl methacrylate, cyclohexyl acrylate, cyclohexyl methacrylate, benzyl acrylate, benzyl methacrylate, isobornyl acrylate, isobornyl methacrylate, betahydroxyethyl acrylate, beta-hydroxyethyl methacrylate, betahydroxypropyl acrylate, beta-hydroxypropyl methacrylate, gammahydroxypropyl methacrylate, beta-hydroxybutyl acrylate, gammahydroxybutyl methacrylate, delta-hydroxybutyl acrylate, betahydroxyoctyl acrylate, and beat-hydroxydecyl methacrylate.

The remaining 50 weight percent or less of said ethylenically unsaturated monomers consists of at least one monomer selected from the group consisting of:

(1) acrylic monomers other than those cited hereinabove, which monomers generally encompass aryl and reactive esters of acrylic and methacrylic acids, such as phenyl acrylate, phenyl methacrylate, aziridinyl acrylate, glycidyl methacrylate, 2-aminoethyl acrylate, 2-aminopropyl methacrylate, 3-aminopropyl methacrylate, and the like;

(2) ethacrylic and crotonic acids and esters thereof, such as ethyl ethacrylate, methyl crotonate, octyl ethacrylate, heptyl crotonate, octadecyl ethacrylate, cyclohexyl ethacrylate, benzyl crotonate, phenyl ethacrylate, and the like;

(3) amides, alkylol amides, and alkoxyalkyl amides of acrylic, methacrylic, and crotonic acids, wherein the alkyl moieties contain from 1 to about 4 carbon atoms and the alkoxy moiety contains from 1 to about 8 carbon atoms, specific examples being acrylamide, methacrylamide, crotonamide, methylol acrylamide, methoxymethyl methacrylamide, butoxymethyl acrylamide, 2-ethylhexoxymethyl metacrylamide, diacetone acrylamide, and the like;

(4) alpha, beta-ethylenically-unsaturated dicarboxylic acids and anhydrides, such as maleic acid, maleic anhydride, fumaric acid, itaconic acid, mesaconic acid, and the like;

(5) mono- and diesters of alpha, beta-ethylenically-unsaturated dicarboxylic acids, examples of which esters are fumaric acid monoethyl ester, dimethyl itaconate, dipropyl mesaconate, diisopropyl maleate, dicyclohexyl maleate, maleic acid mono (beta-hydroxyethyl)ester, and the like;

(6) alpha, beta-ethylenically-unsaturated nitriles, such as acrylonitrile, methacrylonitrile, ethacrylonitrile, crotonic nitrile, and the like;

(7) vinyl aromatic compounds, such as styrene, vinyl toluene, vinylnaphthalene, chlorostyrene, bromostyrene, and the like;

(8) monounsaturated hydrocarbons, such as ethylene, propylene, and the like;

(9) no more than about 10 weight percent of vinyl esters of aliphatic monocarboxylic acids having from 1 to about 18 carbon atoms, such as vinyl acetate, vinyl propionate, vinyl octanoate, vinyl stearate, and the like; and

(10) no more than about 10 weight percent of halogen-containing unsaturated hydrocarbons, such a vinyl chloride, vinyl fluoride, vinylidene chloride, vinylidene fluoride, and the like.

The amount of resin used in general should not be large enough so as to exceed the solubility of the particular solvent used. Thus, there may be used generally from about 35 to about 75, typically from about 40 to about 70 and preferably from about 45 to about 65 percent by weight resin based upon the total weight of the solution.

The curing agent employed in the process of the present invention is used to cure or cross link the resin after it has been applied to the coated surface. The curing agents useful in this process are not activated until a certain critical minimum temperature is reached. At that temperature, and at temperatures in excess of that minimum, the curing agent is activated so as to cure or cross link the resin of the porous metal containing powder particles.

Thus, for example, in using the metal particle-containing powder coating compositions of the present invention as a paint, the particles may be first applied (e.g., electrostatically) to a surface and then the coated surface is heated or baked so as to activate the curing agent and thereby cross link the resin.

The curing agent must be soluble in the solvent and thus is precipitated out by the liquid and remains dispersed throughout the resin in the solid porous metal particle-containing powder coating compositions.

Typical curing agents include multifunctional isocyanates such as toluene isocyanate, polyols, polycarboxylic acids, hydroxylcarboxylic acids, polyamines, hydroxylamines, and other compounds known to those skilled in this art.

A particularly preferred curing agent comprises a blocked triisocyanate, prepared by reacting three moles of 1-isocyanato-3-isocyanatomethyl-3,5,5-trimethylcyclohexane with one mole of 1,1,1-tris-(hydroxymethyl) propane in methyl isobutyl ketone followed by blocking with methyl ethyl ketoxime.

The curing agent may be present in small amounts generally from about 2 to about 60, typically from about 5 to about 40, and preferably from about 10 to about 35 percent by weight of total solution.

The metal particles or flakes employed in the process of the present invention are used in order to impart to the surfaces to which the particles are applied a metallic look or effect. The metal particles or flakes used in the formation of the metal particle-containing powder coating compositions of the present invention remain substantially undegraded in the final metal particle-containing powder coating compositions and thus provide an improved metallic finish when applied to surfaces such as the exterior of an automobile or home appliances.

By the terms "metal particle" or "metal flake" as used in the instant specification is meant any metal-containing composition or other composition similarly susceptible to attrition which is useful in a topcoat, for example, for automobiles, home appliances, etc. Such shear degradable particles include aluminum flake, bronze flake, zinc flake, magnesium flake, copper flake, gold flake, silver flake, platinum flake, mica, glass, brass, stainless steel, coated mica, coated glass, glass beads, and aluminum-coated polyester film fragments. Mixtures of two or more metal particles may also be used.

Aluminum flake is a preferred metal particle for use in the present invention.

The metal paricles may be in any form, e.g., particle or flake. Flake is preferred because of the improved reflectance properties of flake.

The metal, of course, is not soluble in the solvent, but rather remains suspended therein. The metal particles or flakes may have any shape — e.g., flat, spherical, or plate shaped. For example, aluminum flakes are shaped like platelets which are typically about 1 micron thick and have a diameter in the range of 1 to 40 microns or even higher. These platelets may be prepared in a ball mill and tend to have jagged edges.

Since the metal particles or flakes are entrapped within the resin, the size of the resulting metal containing powder particles is dependent to some extent upon the size of the metal particles or flakes. The metal particles or flakes may be present generally from about 0.5 to about 50, typically from about 0.75 to about 40, and preferably from about 1 to about 30 percent by weight based upon the total weight of the solution.

The solution may also contain a pigment if additional color is desired in the final porous metal containing powder particles. The pigment is not soluble in the solvent but is finely pulverized and thus in homogeneous suspension throughout the solvent. The pigments or dyes useful in the present invention are the conventional pigments such as phthalocyanine blue, carbon black, cadmium red, toluidine red, iron oxide, calcium carbonate, barium sulfate, and titanium dioxide.

The pigment is used in rather small amounts, generally from about 0.2 to about 40, typically from about 0.4 to about 20, and preferably from about 1 to about 10 percent by weight based upon the total weight of the solution.

The liquid of the liquid bath functions primarily as a coagulating or precipitating agent. This liquid bath may be composed of a single liquid or combination of liquids. However, each liquid must be miscible with the solvent but cannot be a solvent, or at least must be a very poor solvent, for the resin and curing agent. Any liquid or combination of liquids which meets the above requirements may be used. Such liquids may be either organic or inorganic. Typical organic liquids include hydrocarbons such as hexane, heptane, decane, benzene, toluene, and xylene; ketones such as acetone, methyl ethyl ketone, and methyl isobutyl ketone; and alcohols such as methanol, ethanol, propanol and butanol.

Typical inorganic liquids include water and acidic aqueous solutions such as hydrochloric acid, phosphoric acid, and sulfuric acid.

Water is a particularly preferred liquid for use in the liquid bath.

Generally the ratio of liquid precipitant to resin solution may vary from 0.5:1 to 50:1 or higher.

The solution which comprises resin and curing agent dissolved in solvent as well as suspended metal particles and optionally suspended pigment particles may be prepared in any conventional manner. A preferred method of preparing this solution, however, is to first dissolve the curing agent and part of the resin in the solvent and then to add a "pigment concentrate". The "pigment concentrate" is prepared by milling the pigment and the remainder of the resin in solvent for several passes in a Red Head Sand Mill, for example.

As indicated hereinabove, the first essential step of the present process involves spraying the above-described solution. If the solution is not sprayed, but rather dripped, for example, there results agglomerated masses which are quite large or lumpy and soft since they are plasticized by residual solvent. Particles do not, in general, form. In general, any spraying apparatus such as a pneumatic or hydraulic spraying device may be used to form the droplets of the present invention. A preferred spraying device is an external mix twin fluid pneumatic atomizing nozzle. This device comprises an orifice (from which the liquid is passed) surrounded by an annular ring (from which the air is passed). The velocity of the gas is higher than that of the liquid and so the energy of the gas is transmitted to the liquid, thus dispersing the liquid. This nozzle produces a hollow cone effect —i.e., a cross section of the spray (taken perpendicular to the direction of the spray) appears to be a cone with a hollow conical center. The outer cone contains the sprayed droplets whereas the inner conical center contains essentially only air.

A particularly preferred external mix twin fluid pneumatic atomizing nozzle comprises the inner orifice (for liquid) surrounded by an annular ring (for air) as described above, but in addition contains a plurality of additional external orifices which are directed so as to impinge air upon the air/liquid stream at a 45° angle. The use of this impinging jet external mix twin fluid pneumatic atomizer results in a spray which has the appearance of a flat sheet.

The above-described external mix twin fluid pneumatic atomizers are commercially available, e.g., from Spray Systems, Inc.

The various types of spray apparatus useful in the present process must have orifice diameters large enough so as not to be clogged by the metal particles or flakes or pigment particles which are suspended in the solution. Accordingly, the diameter of the liquid orifices of the spraying apparatus may be generally from about 0.01 to about 0.25, typically from about 0.012 to about 0.05, and preferably from about 0.016 to about 0.025 inch.

The spray apparatus preferably contains a filter or screen so that any large dirt, metal, or pigment particles present in the solution might be removed before the solution passes to the orifice so as to avoid clogging of the orifice. The spray apparatus also preferably contains a gauge for monitoring liquid and gas pressures, a flowmeter for determining gas flow rate and a method for conveying both fluids to the nozzle.

The size of the liquid droplets formed is dependednt upon a number of factors. For example, the size of the liquid droplets has been found to be directly related to the viscosity of the solution (i.e., as the viscosity of the solution increases, the size of the droplets also increases) and inversely related to the mass flow ratio. The mass flow ratio may be defined as the weight ratio of the rate of flow of air to the rate of flow of solution. An increase in the mass flow ratio (caused either by an increase in the rate of flow of air or a decrease in the rate of flow of solution or a combination of both factors) results in a decrease in the size of the liquid droplets. The mass flow ratio generally is about 1/1 to 10/1, typically 2/1 to 6/1, and preferably 4/1 to 5/1.

The viscosity of the solution also may vary, depending upon the particular resin and solvent used but may be generally from about 2 to about 4000, typically from about 10 to about 400 and preferably from about 20 to about 250 centipoise.

The ability of a particular solution to form droplets is also affected by its elasticity. The greater the elasticity of a particular solution, the harder is is to atomize into droplets. Solutions having too large an elasticity cannot be atomized. Rather, such solutions result in elastic stringy materials.

Another factor to consider is the distnace from the nozzle tip to the surface of the liquid medium (discussed hereafter). When this distance is too small string-like rather than spherical particles will be obtained; while when the distance is too great, an excessive amount of solvent will evaporate or the droplets will not impinge upon the radial flow of the liquid medium (discussed hereafter). A typical nozzle to precipitant distance is about 3 to 12 inches, and preferably from 6 to 8 inches. The droplets formed as a result of the spray step generrally have a diameter of from about 10 to about 1000, typically from about 30 to about 200, and preferably from about 20 to about 75 microns.

The second essential step in the process of the present invention comprises a precipitation step which comprises a sudden and uniform dilution of the metal containing droplets in a liquid medium which is miscible with the solvent but is not a solvent, or is at least a very poor solvent, for the other substances in the solution.

The metal containing powder particles produced by the process of the present invention are porous due to the removal or leaching out of solvent by the liquid from the solution droplet.

The liquid bath is used to coagulate or precipitate the resin and curing agent from the liquid droplets. This bath is agitated by feeding the liquid precipitant to the center of the bottom of the bath and creating a radial flow field. This radial flow field carries the particles away from one another and substantially prevents agglomeration. The liquid precipitant and powder particles are carried over the sides of the liquid bath into a second agitated bath where it is withdrawn.

After coagulation has occurred, the porous metal particle-containing powder coating compositions may be removed from the liquid by filtration or any other method of separating solid from liquid.

To prevent agglomeration of the porous metal particle-containing powder coating compositions, i.e., the clumping together of numerous small metal containing powder particles to form larger ones, it is desirable to wash any remaining traces of solvent from the wet powder coating compositions. This may be accomplished either by using fresh liquid which is miscible with the solvent but which is not a solvent, or at least is a poor solvent, for the other components of the solution. This other liquid may be the liquid used in transporting the powder if the powder is to be wet packaged.

The mixture of solvent and liquid from the liquid bath or the liquid that has been used to wash the powder may then be recycled in a closed system. The advantage of this process is that little or no solvent or liquid is lost to the atmosphere thereby avoiding air pollution. Consequently there is no limitation on the choice of solvent or liquid other than the limitations imposed by the properties of the metal containing powder particles they are desired to produce.

Once the powder has been washed, it may be screened to eliminate any undesirable sizes of particles. For example, it may be desired to have only particles less than 40 microns in diameter for wet spraying applications. Electrostatic spraying is more efficient when there are neither very large nor very small particles in the powder; thus it may be desirable to screen out particles below 20 microns and above 80 microns in size.

This wet screening may be carried out using any conventional method. An advantage to wet screening is that no fine paint particles enter the atmosphere as dust.

The particles that have been screened out, and which are not desired for some other application, may be recycled into the original solution by redissolving them in the solvent. These particles will readily dissolve since no irreversible changes take place during the manufacturing process.

If the porous, metal particle-containing powder coating compositions are to be applied in dry form such as by electrostatic spraying or fluidized bed techniques, the powder particles may be dried by any conventional technique such as air or spray drying.

The porous metal particle-containing powder coating compositions of the present invention are generally spherical in shape having mean average diameters of generally from about 15 to about 100, typically from about 18 to about 80, and preferably from about 20 to about 65 microns.

In the process of the present invention, porous metal particle-containing powder coating compositions having a range of particle sizes are generally obtained. The range of particle sizes may be generally from about 10 to about 150, typically from about 20 to about 100, and preferably from about 30 to about 70 microns in diameter when the particles are spherical.

The entire process of the present invention should be carried out at temperatures which are low enough to (1) avoid activating the curing agent, (2) avoid softening the resin, and (3) avoid flashing the solvent. The temperatures, however, should be high enough that the solvent remains in the liquid phase. Thus a temperature of generally from about 0 to about 150, typically from about 10 to about 100, and preferably from about 20 to about 30° C. may be employed.

The entire process may be carried out conveniently at any pressure, atmospheric, subatmospheric, or superatmospheric, although substantially atmospheric pressures are preferred.

The present invention is further illustrated by the following example. All parts and percentages in the example as well as in the specification and claims are by weight unless otherwise specified.

EXAMPLE

This Example is explained with the aid of the drawing. A solution is prepared by moderately agitating the following ingredients.

| Ingredients | Parts by Weight |
| --- | --- |
| Acetone | 40.0 |
| Acrylic resin | 46.4 |
| Phthalocyanine blue pigment | 0.4 |
| Curing Agent* | 12.1 |
| Aluminum flake | 1.1 |

*Prepared by reacting three moles of 1-isocyanato-3-isocyanatomethyl-3,5,5-trimethylcyclohexane with one mole of 1,1,1-tris-(hydroxymethyl) propane in methyl isobutyl ketone followed by blocking with methyl ethyl ketoxime.

The materials are agitated until all the resin and curing agent are dissolved and the insoluble materials (pigment and metal flake) are homogeneously suspended. The solution has a viscosity of 220 cps at 23° C.

The solution is pumped through filter 1 into the nozzle 2 where it is mixed with air which has been pumped through filter 3. The nozzle 2 is an external mix twin fluid pneumatic atomizer having an orifice for liquid surrounded by an annular ring for air and also containing external orifices which are directed so as to impinge air upon the air/liquid stream at a 45° angle. Pressure gauges 16 and 17 are located in the lines leading to the nozzle 2. The orifice for liquid has a diameter of 0.016 inch. and the mass flow ratio (air/liquid) is 5/1.

Droplets with sufficiently small diameters so as to produce particles of the appropriate size are produced in the spray 4. The spray is collected in a circular trough 5 containing primarily water which is at a temperature of 20° C.

The circulating trough contains an inlet 6 for water at the center of the bottom of the trough 5. The incoming water creates a radial flow field which carries the particles away from one another and substantially prevents agglomeration of the same.

The water and powder particles are carried over the sides of the circular trough 5 into collecting bath 7 containing primarily water. This bath is agitated with stirrers 8. The water and powder particles are removed through outlet 9. The resulting powder particle product while suspended in water is removed through line 10. Also a portion of the stream withdrawn from collecting bath 7 is recycled via recycle pump 11 through line 12 back to the circular trough 5. Additional water is supplied through line 13. Uniform air pressure is maintained above collecting bath 7 by means of pressure gauge 14 and exhaust port 15.

After washing, filtration, and drying, porous metal containing powders having a means average diameter of 50 microns are obtained. The particles have a size range of from 10 to 250 microns, and a bulk density of 0.2 to 0.3 gms./cc.

As indicated hereinabove, the metal particle-containing powder coating compositions of the present invention are useful generally in powder applications, and especially in powder painting. These porous particles are particularly useful when it is desired to produce metal particle-containing powder coating wherein the metal particle or flake is substantially undegraded and wherein the powder coating compositions are in substantially non-agglomerated form.

COMPARATIVE EXAMPLE

This Comparative Example illustrates the effect of eliminating the radial flow field in the production of powder coating compositions.

The amounts, weights, ingredients, and apparatus used in this Comparative Example are the same as those used in the Example with the exception of the circular trough 5, which is eliminated. In this Comparative Example, the sprayed droplets impinge directly into collecting bath 7 and are otherwise treated as described in the Example.

The powder coating compositions produced in accordance with this Comparative Example are substantially agglomerated and thus unfit for thin film applications such as coil coatings.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A process for preparing uncured curable porous metal particle-containing powder coating compositions useful in powder coating applications, which process comprises (a) atomizing by spraying a gas which is intermixed with a solution comprising a solvent, a resin which is melt extrudable and which will cure in the presence of a curing agent, a curing agent which will cross-link said resin upon the application of heat, and suspended metal particles to form droplets, and (b) collecting the sprayed droplets in a liquid bath wherein said liquid is miscible with said solvent but said liquid is a non-solvent for the solutes of the solution and wherein said liquid bath is subjected to a radial flow motion whereby said flow motion carries the particles away from one another thereby precipitating said powder coating compositions in substantially non-agglomerated form.

2. The process of claim 1 wherein the solution of step (a) additionally contains a suspended pigment.

3. The process of claim 2 wherein the precipitated resin containing entrapped metal particles is further washed, filtered, and dried.

4. The process of claim 3 wherein said solvent is acetone, said resin is an acrylic, said pigment is phthalocyanine blue pigment, said curing agent is prepared by reacting three moles of 1-isocyanato3-isocyanatomethyl-3,5,5-trimethylcyclohexane with one mole of 1,1,1-tris-(hydroxymethyl) propane in methyl isobutyl ketone followed by blocking with methyl ethyl ketoxime, said metal particles are aluminum flake, and said liquid is water.

5. A process for preparing uncured curable porous metal particle-containing powder coating compositions useful in powder coating applications, which process comprises (a) atomizing by spraying a gas which is intermixed with a solution comprising from about 25 to about 55% by weight of a solvent, from about 35 to about 75% by weight of a resin which is melt extrudable and which will cure in the presence of a curing agent, from about 2 to about 60% by weight of a curing agent which will cross-link said resin upon the application of heat, and from about 0.5 to about 50% by weight suspended metal particles, to form droplets, and (b) collecting the sprayed droplets in a liquid bath wherein said liquid is miscible with said solvent, but said liquid is a non-solvent for the solutes of the solution and wherein said liquid bath is subjected to a radial flow motion whereby said flow motion carries the particles away from one another thereby precipitating said powder coating compositions in substantially non-agglomerated form, and then (c) washing, (d) filtering, and (e) drying the powder coating compositions.

6. The process of claim 5 wherein said process is carried out at a temperature of from about 0° to about 150° C. and at a substantially atmospheric pressure.

7. The process of claim 6 wherein the solution of step (a) additionally contains a suspended pigment.

8. A process for preparing uncured curable porous aluminum flake-containing powder coating compositions useful in powder coating applications, which comprises (a) atomizing by spraying a gas which is intermixed with a solution comprising acetone, an acrylic resin which is melt extrudable and which will cure in the presence of a curing agent, a curing agent prepared by reacting three moles of 1-isocyanato-3-isocyanatomethyl-3,5,5-trimethylcyclohexane with one mole of 1,1,1-tris-(hydroxymethyl) propane in methyl isobutyl ketone followed by blocking with methyl ethyl ketoxime, wherein said curing agent will cross-link said resin upon the application of heat, phthalocyanine blue pigment, and suspended aluminum flakes to form droplets, (b) collecting the sprayed droplets in a water bath wherein said water bath is subjected to a radial flow motion whereby said flow motion carries the particles away from one another thereby precipitating the powder coating compositions in substantially non-agglomerated form, (c) washing the resulting powder coating compositions, (d) filtering, and (e) drying the powder coating compositions.

9. The process of claim 8 wherein said powder coating composition comprises from about 30 to about 50% by weight acetone, from about 40 to about 70% by weight acrylic resin, from about 5 to about 40% by weight curing agent, from about 0.2 to about 20% by weight pigment and from about 0.75 to about 0.40% by weight aluminum flake.

10. The process of claim 9 wherein said powder coating composition comprises from about 35 to about 45% by weight acetone, from about 45 to about 65% by weight acrylic resin, from about 10 to about 35% by weight curing agent, from about 0.4 to about 10% by weight pigment and from about 1 to about 30% by weight aluminum flake.

11. The process of claim 10 wherein said process is carried out at a temperature of 10° to 100° C. and at substantially atmospheric pressure.

12. The process of claim 11 wherein said droplets have a diameter of from about 10 to about 200 microns.

13. The process of claim 8 wherein said powder coating composition has a mean average diameter of from about 20 to about 65 microns.

* * * * *